2,943,701
PROCESS FOR PURIFICATION OF GASEOUS FORMALDEHYDE

Dennis Light Funck, Wilmington, Del., assignor to E. I. du Pont de Nemours and Company, Wilmington, Del., a corporation of Delaware No Drawing. Filed Apr. 4, 1957, Ser. No. 650,571

17 Claims. (Cl. 183—115)

This invention relates to a novel process for the purification of formaldehyde and, more particularly, to a process for continuous purification of gaseous formaldehyde by contacting a flowing stream of gaseous formaldehyde with a flowing surface of a cold, liquid hemiformal solution formed by the reaction of formaldehyde with a primary or secondary alcohol.

In the past, pure, anhydrous gaseous formaldehyde has been considered a rare laboratory curiosity which could be obtained only by the distillation of very pure liquid formaldehyde. Gaseous formaldehyde containing even traces of water or acids polymerizes to solid, low polymers at temperatures below 100° C. Preparation of pure liquid formaldehyde by pyrolysis of dry paraforms or alkali-precipitated alpha-polyoxymethylene, condensation of the impure liquid at very low temperatures, and redistillation in the presence of phosphorus pentoxide or through cold traps which purify the vapor by partial polymerization has been described by Walker. ("Formaldehyde" by J. Frederic Walker, American Chemical Society Monograph Series, 2nd edition, Reinhold Publishing Corp., New York, pp. 41–44.) Such procedures are obviously cumbersome and unsuited to the large-scale production of very pure formaldehyde. An improved procedure for obtaining formaldehyde gas with less than 0.1% water and less than 0.05% formic acid is described in copending United States application Serial No. 636,460, filed by D. L. Funck on January 28, 1957, now Patent No. 2,848,500, issued August 19, 1958, which describes the preparation of substantially anhydrous formaldehyde gas by the pyrolysis of dry cyclohexyl hemiformal followed by a partial condensation to remove cyclohexanol from the pyrolysis products. While the process described in Serial No. 636,460 may be operated to produce formaldehyde containing less than about 500 parts per million water and less than about 10 parts per million formic acid, it is often desirable to further purify even the product obtained by this process. Other methods of preparing purified formaldehyde monomer are described in copending U.S. applications Serial No. 365,234, filed June 30, 1953, by R. N. MacDonald, now Patent No. 2,841,570, issued July 1, 1958; Serial No. 419,087, filed March 26, 1954, by G. S. Stamatoff, now abandoned; Serial No. 456,561, filed September 16, 1954, by R. E. Elder, now Patent No. 2,824,051, issued February 18, 1958; and Serial No. 481,970, filed January 14, 1955, by Gelu S. Stamatoff, now abandoned; and in U.S. Patent 2,780,652, issued February 5, 1957, to F. W. Gander.

An object of this invention is to provide a process for continuously removing 60% to 98% of normally liquid impurities from formaldehyde gas containing 5% or less of impurities comprising water, higher aldehydes and ketones, methanol, higher alcohols such as cyclohexanol, organic acids such as formic acid, esters such as methyl formate, and similar normally liquid impurities associated with the method of preparation of the impure formaldehyde. This process is not suitable for the removal of sizeable amounts of normally gaseous materials such as $N_2$, $O_2$, $CO_2$ and $CO$. Another object of this invention is to provide a highly purified formaldehyde gas particularly useful in the preparation of tough, stable high polymers of formaldehyde such as disclosed in U.S. Patent 2,768,994, issued to R. N. MacDonald on October 30, 1956, and in copending U.S. applications Serial No. 365,235, filed June 30, 1953, by R. N. MacDonald, now Patent No. 2,828,286, issued March 25, 1958, and Serial No. 521,878, filed July 13, 1955, by H. H. Goodman, Jr., et al., now abandoned. Other objects and advantages of this invention will become apparent from the following description and examples.

The objects of this invention are accomplished by a process for the purification of gaseous formaldehyde containing from 0.04 to 5% by weight of normally liquid impurities which comprises forming a flowing liquid-gas interface by passing a stream of the impure gaseous formaldehyde into contact with a flowing surface of a liquid hemiformal solution containing initially from 8 to 73 mole percent of combined plus dissolved formaldehyde, and from 92 to 27 mole percent of an alcohol chosen from the group consisting of primary and secondary alcohols containing from 5 to 12 carbon atoms per molecule, said liquid hemiformal solution being in the form of a continuous film flowing over an inert solid surface maintained at −15° to +20° C. and maintaining said flowing liquid-gas interface for a time sufficient to allow 60% to 98% of the impurities originally in the formaldehyde gas to diffuse to the liquid-gas interface and to dissolve in the liquid hemiformal solution.

A preferred method of carrying out the aforesaid process is one which comprises contacting flowing streams of said impure gaseous formaldehyde with a liquid hemiformal solution flowing as a multiplicity of continuous films, separated by from 4 mm. to 30 mm. of said flowing gaseous formaldehyde, downward over smooth, inert, solid surfaces maintained at −15° to +20° C., said liquid hemiformal solution being formed from the reaction of from 8 to 73 mole percent of formaldehyde with from 92 to 27 mole percent of an alcohol chosen from the group consisting of primary and secondary alcohols containing from 5 to 12 carbon atoms per molecule, and maintaining contact of said flowing gas with said flowing liquid film until from 60% to 98% of the impurities originally present in said impure formaldehyde have diffused to the flowing liquid surface and dissolved in said liquid hemiformal solution.

It should be obvious from the wide concentration range over which formaldehyde may be added to an alcohol to form hemiformal solutions of the type employed in this process that the hemiformal solutions may consist essentially of a solution of hemiformal in alcohol or, equally well, of formaldehyde in hemiformal. Since the reactions between formaldehyde and alcohols to form hemiformals are reversible, all such liquid hemiformal solutions consist essentially of a mixture of an alcohol, formaldehyde, and a hemiformal, although the concentration of free, dissolved, monomeric formaldehyde is always very low since, even when present in excess of 50 mole percent, most of the formaldehyde will be chemically combined with the hemiformal as short polyformaldehyde chains. A low concentration of free monomeric formaldehyde in the liquid phase is an important feature of this novel process for purification.

In particular, a convenient and efficient method for bringing about this contact of flowing, liquid hemiformal solution with a flowing stream of gaseous formaldehyde is a process in which the flowing liquid-gas interface is maintained inside a vertical, smooth-bore tube and in which a liquid hemiformal solution formed from an alcohol chosen from the group consisting of primary and secondary alcohols containing from 5 to 12 carbon atoms per molecule and containing from 8 to 73 mole percent of combined plus dissolved formaldehyde forms a continuous cylindrical film flowing down the walls of the tube with the gaseous formaldehyde flowing through the tube, said tube having a length-to-internal diameter ratio of from 60 to 1525, an internal diameter of from 4 mm. to 20 mm., and a length of from 2 to 25 feet, the walls of said tube being cooled externally by circulation of a fluid coolant at from −15° to +20° C. It has been found that when the process of this invention is operated in this fashion, 60% to 98% of the impurities will be removed when the ratio by weight of the rate of flow of the liquid hemiformal solution to the rate of flow of the gaseous formaldehyde is between 0.2 and 4.0 and the rate of flow of gaseous formaldehyde is from 0.5 gram to 25 grams per minute. Furthermore, it has been found advantageous to cool the tube with coolant at a temperature between −15° and +20° C. and, more particularly, between +1° and +5° C. Instead of a straight tube with smooth bore, the tube may have baffles, ripples, or may contain some sort of packing to provide turbulence in the gas. Equally well, the tube may be in some form of spiral or bulbous construction. However, the preferred form of tube is a vertical, smooth-bore tube since this makes it possible to keep the entire surface continuously wet with the flowing hemiformal solution, and thus to prevent the occurrence of stagnant or dry areas which might provide sites for the initiation of formaldehyde polymerization.

The liquid hemiformal solution employed may be formed by the reaction of formaldehyde with any primary or secondary alcohol which will give a fluid product having a low enough viscosity so that the solution will flow freely in the operating temperature range of −15° to +20° C., and which alcohol has itself a sufficiently low vapor pressure over said operating temperature range so that it will not, itself, contaminate the formaldehyde gas. Alcohols having from 5 to 12 carbon atoms fall in this range; even though many of these alcohols are solids when pure, the addition of at least 8 mole percent of formaldehyde converts them into liquid solutions of hemiformal in alcohol. Cyclohexanol is a particularly suitable alcohol for this process. Tertiary alcohols are not suitable for this process because of the slow rate of reaction of such alcohols with formaldehyde; this results in diffusion of unreacted formaldehyde from the flowing gas stream through the flowing liquid hemiformal to the cold surface beneath, and the formation of polymeric formaldehyde on said cold surface during the operation of the subject process for purification of formaldehyde. For the same reasons, other inert liquids, such as hydrocarbons, which do not react with formaldehyde are unsuitable for use in this process.

The liquid hemiformal solutions employed in the operation of the subject novel purification process may be formed by the reaction of gaseous formaldehyde with liquid alcohol and be introduced into the process in any convenient manner, as by pumping the preformed hemiformal solution over a weir at the top of a purification tube of a type described hereinabove. If the pure alcohol is liquid at operating temperatures, the hemiformal may be formed in situ by pumping in the pure alcohol. Equally well, the hemiformal may be formed in the vapor phase by mixing a vaporized alcohol with a hot formaldehyde vapor stream and then condensing the reaction products plus any unreacted alcohol on cold surfaces of a type already described. In order to prevent spontaneous polymerization, the walls of the tube must be completely wet with the hemiformal solution before any gaseous formaldehyde is admitted. It is desirable in order to obtain maximum purification to cool the formaldehyde gas to as low a temperature as possible without condensing the formaldehyde during contact with the hemiformal solution, and for this purpose it is preferred to use a tube with a relatively high ratio of length-to-internal diameter. A particularly desirable tube for carrying out the process of this invention is one with an internal diameter of 6 to 8 millimeters and a length of from 4 to 10 feet.

When it is desired to carry out the purification of formaldehyde continuously on a large scale, a large number of such tubes may be constructed in parallel and enclosed inside a large cooling jacket with provision for circulation of coolant uniformly around the outside of each of the tubes. The hemiformal solution employed can then be recirculated, with provision for continuous purification and removal of formaldehyde by distillation from a portion of the hemiformal solution to maintain a constant composition. In a preferred method of operation, the hemiformal solution will contain approximately the theoretical amount of formaldehyde, one molar equivalent for each mole of alcohol; when the alcohol employed is cyclohexanol, this amounts to about 23% by weight. In some cases, it is desirable to operate with a hemiformal solution containing excess dissolved formaldehyde, up to about 73 mole percent of formaldehyde in the alcohol in order to increase the recovery of purified formaldehyde.

The operation of this invention is further described by the following examples which are intended to be illustrative of the invention without in any way limiting its scope to the particular conditions described in the examples. It is obvious that anyone skilled in the art could alter various conditions without in any way departing from the spirit of the invention. Except where otherwise indicated, the percentages given in the examples are percent by weight.

EXAMPLE 1

In this experiment, formaldehyde gas of approximately 98.4% purity was continuously purified to about 99.9% purity by passage through a vertical glass tube co-currently with a flowing film of cyclohexyl hemiformal. The glass tube was 10 mm. inside diameter and 600 mm. long, and perfectly smooth-surfaced. At the top, the tube was equipped with a weir over which the cyclohexyl hemiformal could be continuously pumped to the internal walls of the tube as a flowing film of uniform thickness which kept all parts of the interior walls of this tube coated with cyclohexyl hemiformal. The tube was jacketed and cooled by pumping a coolant through the jacket; the inlet temperature of the coolant was 3° C. The cyclohexyl hemiformal solution employed in this experiment had a formaldehyde content of approximately 22% [23.1% (50 mole percent) is theoretical for 100% cyclohexyl hemiformal] and a water content of about 0.1%. It was prepared by reacting cyclohexanol with one molar equivalent of aqueous formaldehyde and then dehydrating the product by vacuum distillation.

The procedure followed was to start with clean, dry apparatus, introduce the cyclohexyl hemiformal and obtain a steadily flowing film of it so that the walls of the tube were completely wet with it, and then the impure formaldehyde gas stream was allowed to pass through the tube. The cyclohexyl hemiformal was collected in a reservoir at the bottom of the tube. After passage through the tube, the purified formaldehyde was vented through a side tube in the bottom reservoir and absorbed in various pure solvents for chemical analyses. Similar analyses were obtained on the impure formaldehyde before passage through the tube. In this experiment, the effects of varying the ratio of cyclohexyl hemiformal flowing over the walls to the formaldehyde gas flowing through the tube was investigated at a relatively constant gas-flow rate. Results are summarized in Table I.

Table I

| Run No. | Operating Conditions ||||| Purification Effected |||||||||| Percent Purity of CH₂O Obtained |
|---|---|---|---|---|---|---|---|---|---|---|---|---|---|---|---|
| | Inlet Gas Rate, g./min | CHHF[1] Rate, g./min. | Ratio CHHF/ CH₂O | Hold-up Time, Secs. | CH₂O Absorbed in CHHF, Percent | Water ||| Methanol ||| Formic Acid ||| |
| | | | | | | Inlet, p.p.m. | Exit, p.p.m. | Percent Removed | Inlet, p.p.m. | Exit, p.p.m. | Percent Removed | Inlet, p.p.m. | Exit, p.p.m. | Percent Removed | |
| 1 | 1.9 | 7.6 | 4.1 | 1.7 | 23.5 | 9,600 | 624 | 93.6 | 5,500 | 360 | 93.5 | 316 | 11 | 96.6 | 99.90 |
| 2 | 1.9 | 3.0 | 1.6 | 1.6 | 13.5 | 9,600 | 746 | 92.3 | 5,500 | 400 | 92.8 | 316 | 20 | 93.8 | 99.88 |
| 3 | 1.8 | 1.1 | 0.62 | 1.7 | 9.0 | 9,600 | 771 | 92.0 | 5,500 | 602 | 89.0 | 316 | 23 | 92.8 | 99.86 |

[1] CHHF = cyclohexyl hemiformal.

From inspection of the data in this table, it is seen that more than 90% of the impurities in the formaldehyde, as measured by water, methanol, and formic acid, were removed by this purification. A greater degree of purification was obtained at the higher CHHF/CH₂O ratio, but, likewise, more formaldehyde was absorbed under these conditions. The formaldehyde obtained was suitably pure for polymerization to high-molecular weight, stable polymers of formaldehyde as described in U.S. Patent 2,768,994.

EXAMPLE 2

The apparatus and procedure described in Example 1 were employed in this experiment. Here, however, an initially somewhat purer formaldehyde gas stream (99.2% formaldehyde) than in Example 1 was subjected to purification. Higher gas flow rates were employed, and the inlet coolant temperature was 6° C. Formaldehyde of 99.92% to 99.4% purity was obtained. Table II gives the details of this experiment.

since the purity of the inlet formaldehyde was higher than in Example 1, a more highly-purified formaldehyde monomer was obtained from the exit.

EXAMPLE 3

A glass tube 7 mm. in internal diameter and 1210 mm. long was constructed in which a weir was provided at the top whereby the smooth walls of the tube could be kept evenly wet with a flowing film of cyclohexyl hemiformal. The tube was jacketed and cooled as described in Example 1. Cyclohexyl hemiformal containing about 22% formaldehyde and 0.1% water was employed.

With this tube a number of runs were made, as illustrated by the data in Table III, in order to evaluate various operating conditions including co-current and counter-current gas flow, high and low rates of gas flow, various ratios of cyclohexyl hemiformal to formaldehyde, and the purification of formaldehyde streams in which the original composition varied from 97% formaldehyde to 99.96% formaldehyde before purification. As in the

Table II

| Run No. | Operating Conditions ||||| Purification Effected |||||||||| Percent Purity of CH₂O Obtained |
|---|---|---|---|---|---|---|---|---|---|---|---|---|---|---|---|
| | Inlet Gas Rate, g./min | CHHF Rate, g./min. | Ratio CHHF/ CH₂O | Hold-up Time, Sec. | CH₂O Absorbed in CHHF, Percent | Water ||| Methanol ||| Formic Acid ||| |
| | | | | | | Inlet, p.p.m. | Exit, p.p.m. | Percent Removed | Inlet, p.p.m. | Exit, p.p.m. | Percent Removed | Inlet, p.p.m. | Exit, p.p.m. | Percent Removed | |
| 4 | 3.1 | 11.4 | 3.7 | 0.99 | 15.2 | 6,000 | 459 | 92.3 | 1,700 | 171 | 90.1 | 159 | 25 | 84.3 | 99.93 |
| 5 | 3.2 | 7.6 | 2.4 | 0.93 | 12.3 | 6,000 | 497 | 91.7 | 1,700 | 196 | 88.5 | 159 | 16 | 89.9 | 99.93 |
| 6 | 3.1 | 3.0 | 0.97 | 0.95 | 9.9 | 6,000 | 610 | 98.8 | 1,700 | 229 | 86.5 | 159 | 21 | 86.8 | 99.91 |

The gas streams were analyzed as described in Example 1. About 90% of the impurities were removed, although, at these higher gas flow rates, the percent of impurities removed was slightly less than in Example 1, particularly with respect to the formic acid. However, previous examples, it was important that the clean walls of the tube be thoroughly wet by cyclohexyl hemiformal before starting the flow of formaldehyde gas through the tube. The reservoir and side tube at the bottom were provided as described in Example 1.

Table III

| Run No. | Operating Conditions |||||| CH₂O Absorbed in CHHF Percent | Purification Effected |||||||||| Purity of CH₂O Obtained, Percent |
|---|---|---|---|---|---|---|---|---|---|---|---|---|---|---|---|---|
| | Direction of Gas Flow | Inlet Coolant Temp., °C. | Exit Gas Temp., °C. | Inlet Gas Rate, g./min. | CHHF Rate, g./min. | Ratio, CHHF/ CH₂O | | Water ||| Methanol ||| Formic Acid ||| |
| | | | | | | | | Inlet, p.p.m. | Exit, p.p.m. | Percent Removed | Inlet, p.p.m. | Exit, p.p.m. | Inlet, p.p.m. | Exit, p.p.m. | | |
| 7 | co-current | 5-6 | 19 | 2.7 | 11.4 | 3.8 | 16.2 | 5,800 | 213 | 96.4 | 1,300 | 70 | 166 | 9 | | 99.97 |
| 8 | do | 5-6 | 20 | 3.0 | 7.6 | 2.5 | 14.1 | 5,800 | 250 | 95.7 | 1,300 | 82 | 166 | 9 | | 99.97 |
| 9 | do | 5-6 | 22 | 3.0 | 3.0 | 1.0 | 10.0 | 5,800 | 340 | 94.2 | 1,300 | 109 | 166 | 10 | | 99.95 |
| 10 | do | 2 | 18 | 9.4 | 11.4 | 1.2 | 7.8 | 4,500 | 809 | 82.0 | 2,700 | 370 | 376 | 16 | | 99.88 |
| 11 | do | 2 | 22 | 9.5 | 7.6 | 0.79 | 6.1 | 4,500 | 734 | 83.8 | 2,700 | 331 | 376 | 25 | | 99.89 |
| 12 | do | 2 | 24 | 8.5 | 3.0 | 0.36 | 2.3 | 4,500 | 753 | 83.3 | 2,700 | 340 | 376 | 27 | | 99.89 |
| 13 | counter-current | 2 | 23 | 4.2 | 3.0 | 0.71 | 7.6 | 6,300 | 435 | 93.2 | 1,900 | 104 | 142 | 6 | | 99.94 |
| 14 | co-current | 2 | 23 | 5.4 | 3.0 | 0.56 | 8.4 | 6,000 | 1,000 | 85.2 | 2,600 | 565 | 228 | 27 | | 99.84 |
| 15 | counter-current | 2 | 23 | 4.2 | 7.6 | 1.8 | 9.4 | 6,300 | 401 | 93.6 | 1,900 | 103 | 142 | 7 | | 99.95 |
| 16 | do | 2 | 24 | 3.9 | 11.4 | 2.9 | 12.9 | 6,300 | 458 | 92.7 | 1,900 | 102 | 142 | 8 | | 99.94 |
| 17 | co-current | 2 | 12 | 2.7 | 7.6 | 2.8 | 17.5 | 11,200 | 469 | 96.7 | 4,900 | 197 | 247 | 7 | | 99.93 |
| 18 | do | 4 | 15 | 1.8 | 3.0 | 1.7 | 14.9 | 17,800 | 734 | 96.8 | 9,900 | 406 | 208 | nil | | 99.89 |
| 19 | do | 1 | 14 | 4.7 | 11.4 | 2.4 | 11.0 | 71 | 21 | 73.7 | 304 | 35 | 7 | 5 | | 99.994 |
| 20 | do | 1 | 15 | 4.5 | 7.6 | 1.7 | 10.0 | 71 | 31 | 60.7 | 304 | 51 | 7 | 5 | | 99.991 |
| 21 | do | 1 | 17 | 4.6 | 3.0 | 0.66 | 7.0 | 71 | 26 | 65.8 | 304 | 59 | 7 | 5 | | 99.991 |

Inspection of the data of Table III shows that the tube employed here was somewhat superior to that employed in Examples 1 and 2 with respect to amount of purification obtainable under similar conditions (compare Runs 5 and 8, Tables II and III). It was observed that the gas flow could be either co-current or counter-current to the cyclohexyl hemiformal; results are comparable. By this procedure, 97% formaldehyde can be purified to 99.9% or better formaldehyde, and 99.96% formaldehyde can be purified to better than 99.99% formaldehyde.

EXAMPLE 4

A glass tube 13 mm. in internal diameter and 1210 mm. long was constructed in which a weir was provided at the top whereby the smooth walls of the tube could be kept evenly wet with a flowing film of cyclohexyl hemiformal. The tube was jacketed and cooled by pumping coolant through the jacket, as described in Example 1.

Cyclohexyl hemiformal, containing about 22% formaldehyde and 0.1% water, prepared as described in Example 1, was started flowing over the weir, coating the walls of the tube with a continuous flowing film of liquid. The cyclohexyl hemiformal was collected in a reservoir connected to the bottom of the tube. Impure formaldehyde gas was started flowing through the tube, and the purified gas was removed through a side tube from the bottom reservoir and analyzed as described in Example 1. Operating data and results obtained with this tube are listed in Table IV.

EXAMPLE 5

A glass tube 4 mm. in internal diameter and 1210 mm. long was constructed in which a weir was provided at the top whereby the smooth walls of the tube could be kept evenly wetted with a flowing film of cyclohexyl hemiformal as described in Example 1. The tube was jacketed and cooled by pumping coolant through the jacket.

Cyclohexyl hemiformal, containing about 22% formaldehyde and 0.1% water, prepared as described in Example 1, was started flowing over the weir, coating the walls of the tube with a continuous, flowing film of liquid. The cyclohexyl hemiformal was collected in a reservoir connected to the bottom of the tube. Impure formaldehyde gas was started flowing through the tube, and the purified gas was removed through a side tube from the reservoir below the tube and analyzed as described in Example 1. Typical operating data and results obtained using this tube are listed in Table V.

*Table V*

| Run No. | Operating Conditions | | | | | | $CH_2O$ Absorbed in CHHF (Percent of input) | Purification Effected | | | | | | | Purity of $CH_2O$ Obtained, Percent |
|---|---|---|---|---|---|---|---|---|---|---|---|---|---|---|---|
| | Direction of Gas Flow | Inlet Coolant Temp., °C. | Exit Gas Temp., °C. | Inlet Gas Rate, g./min. | CHHF Rate, g./min. | Ratio, CHHF/ $CH_2O$ | | Water | | | Methanol | | Formic Acid | | |
| | | | | | | | | Inlet, p.p.m. | Exit, p.p.m. | Percent Removed | Inlet, p.p.m. | Exit, p.p.m. | Inlet, p.p.m. | Exit, p.p.m. | |
| 25 | co-current | 4 | 25 | 1.7 | 3.0 | 1.8 | 18.4 | 23,700 | 1,100 | 96.2 | 6,400 | 270 | 133 | 8 | 99.86 |
| 26 | do | 4 | 22 | 0.78 | 3.0 | 3.9 | 19.2 | 30,600 | 672 | 98.3 | 5,500 | 269 | 104 | 3 | 99.91 |

Inspection of the data in Table V shows that, while the use of this tube in carrying out the process of this invention resulted in the removal of a high percentage of the impurities, equally good results could be obtained with tubes of larger diameter, particularly as described in Example 3. Furthermore, the use of larger diameter tubes permitted greater throughput of formaldehyde gas.

EXAMPLE 6

For this experiment, the tube and procedure described

*Table IV*

| Run No. | Operating Conditions | | | | | | $CH_2O$ Absorbed in CHHF, Percent | Purification Effected | | | | | | | Purity of $CH_2O$ Obtained, Percent |
|---|---|---|---|---|---|---|---|---|---|---|---|---|---|---|---|
| | Direction of Gas Flow | Inlet Coolant Temp., °C. | Exit Gas Temp., °C. | Inlet Gas Rate, g./min. | CHHF Rate, g./min. | Ratio, CHHF/ $CH_2O$ | | Water | | | Methanol | | Formic Acid | | |
| | | | | | | | | Inlet, p.p.m. | Exit, p.p.m. | Percent Removed | Inlet, p.p.m. | Exit, p.p.m. | Inlet, p.p.m. | Exit, p.p.m. | |
| 22 | co-current | 3 | 28 | 10.3 | 3.0 | 0.29 | 3.1 | 6,500 | 1,500 | 76.9 | 2,800 | 1,040 | 112 | 24 | 99.74 |
| 23 | do | 3 | 24 | 10.6 | 7.6 | 0.72 | 5.4 | 6,500 | 1,500 | 76.9 | 2,800 | 770 | 112 | 22 | 99.77 |
| 24 | do | 3 | 25 | 10.7 | 11.4 | 1.1 | 6.4 | 6,500 | 1,200 | 81.5 | 2,800 | 950 | 112 | 21 | 99.78 |

Inspection of the data in Table IV shows that the tube employed in these experiments permitted higher throughput and higher formaldehyde recovery (lower percent formaldehyde absorbed) than could be obtained with the tube employed in Example 3. However, the percentage of the impurities removed was not as great as was the case with the procedure followed in Example 3.

in Example 3 were employed, except that the composition of the cyclohexyl hemiformal was varied by the use of cyclohexyl hemiformal containing added formaldehyde dissolved in it to reduce the amount of formaldehyde absorbed during the purification process. Results of representative purification runs are given in Table VI.

Table VI

EFFECT OF CH₂O CONCENTRATION IN THE CHHF (7 MM. × 4 FT. TUBE, CO-CURRENT)

| Run No. | Operating Conditions | | | | | | CH₂O Absorbed, Percent | Purification Effected | | | | | | | | |
|---|---|---|---|---|---|---|---|---|---|---|---|---|---|---|---|---|
| | Percent CH₂O in CHHF | Inlet Gas Rate, g./min. | CHHF Rate, g./min. | CHHF/CH₂O Ratio | Inlet Coolant Temp., °C. | Exit Gas Temp., °C. | | Water | | | Methanol | | | Formic Acid | | |
| | | | | | | | | Inlet, p.p.m. | Exit, p.p.m. | Percent Removed | Inlet, p.p.m. | Exit, p.p.m. | Percent Removed | Inlet, p.p.m. | Exit, p.p.m. | Percent Removed |
| 14 | 21.8 | 5.4 | 3.0 | 0.56 | 2 | 23 | 8.4 | 6,000 | 1,000 | 85.8 | 2,600 | 565 | 78.3 | 228 | 27 | 88.1 |
| 27 | 25.7 | 5.1 | 3.0 | 0.60 | 3 | 22 | 5.3 | 6,000 | 935 | 85.2 | 2,600 | 440 | 83.1 | 228 | 29 | 87.4 |
| 28 | 31.3 | 5.3 | 3.0 | 0.57 | 3 | 21 | 5.0 | 6,000 | 823 | 86.8 | 2,600 | 370 | 85.8 | 228 | 26 | 88.6 |
| 29 | 40.8 | 5.1 | 3.0 | 0.59 | 3 | 21 | 1.4 | 6,000 | 898 | 85.3 | 2,600 | 450 | 82.8 | 228 | 23 | 90.0 |

Inspection of the data obtained in these experiments employing cyclohexyl hemiformal solution containing dissolved, free formaldehyde shows that the loss of formaldehyde by dissolution can be reduced in this way without decreasing the effectiveness of purification of the formaldehyde gas stream.

EXAMPLE 7

In this experiment, low concentrations of formaldehyde in cyclohexanol were employed so that the resulting solution was, in fact, a solution of cyclohexyl hemiformal in cyclohexanol. The apparatus of Example 3, a glass tube of 7 mm. internal diameter and 1210 mm. long, was employed with co-current operation. Typical results are tabulated in Table VII. In the case of Run No. 30, in which the cyclohexyl hemiformal solution contained 7 weight percent formaldehyde, it was possible to operate with coolant at 5° C., while in the case of Run No. 31, where the concentration of formaldehyde was reduced to 2.6 weight percent in the cyclohexanol, it was preferable to operate with coolant at 20° C. in order to maintain the viscosity of the cyclohexyl hemiformal solution below 200 centipoises so that the cyclohexyl hemiformal solution would flow freely down the tube without bridging.

The foregoing examples illustrate a few specific embodiments without limiting the scope of the invention, which, in essence, comprises the discovery that formaldehyde gas can be purified to a remarkable extent from normally liquid impurities associated with the method of preparation by contacting a flowing stream of gaseous formaldehyde with a flowing body of a liquid hemiformal solution in such a way that the impurities in the formaldehyde will diffuse to the surface of the hemiformal, dissolve, and diffuse into the hemiformal solution, leaving the stream of gaseous formaldehyde highly purified. Surprisingly, this can be done without excessive loss of formaldehyde to the liquid hemiformal solution.

The purified formaldehyde gas obtained by the practice of this invention is of use in many syntheses where high purity is essential to success as in the preparation of high polymers and copolymers containing formaldehyde. For many purposes, the highly purified formaldehyde must be protected from contamination by reactions with itself catalyzed by materials of construction used in piping and storage. Suitable inert materials for lining pipes and vessels containing the purified formaldehyde include polytetrafluoroethylene resin, No. 316 or No. 304 stainless steel, nickel, silver, and titanium. Copper, mild

Table VII

OPERATION WITH SOLUTION OF CHHF IN CYCLOHEXANOL (LOW FORMALDEHYDE CONCENTRATION) (7 MM. × 4 FT. TUBE, CO-CURRENT)

| Run No. | Operating Conditions | | | | | | CH₂O Absorbed, Percent | Purification Effected | | | | | | | | |
|---|---|---|---|---|---|---|---|---|---|---|---|---|---|---|---|---|
| | Percent CH₂O in CHHF | Inlet Gas Rate, g./min. | CHHF Rate, g./min. | CHHF/CH₂O Ratio | Inlet Coolant Temp., °C. | Exit Gas Temp., °C. | | Water | | | Methanol | | | Formic Acid | | |
| | | | | | | | | Inlet, p.p.m. | Exit, p.p.m. | Percent Removed | Inlet, p.p.m. | Exit, p.p.m. | Percent Removed | Inlet, p.p.m. | Exit, p.p.m. | Percent Removed |
| 30 | 7.0 | 4.2 | 2.9 | 0.69 | 5 | 21 | 11.4 | 1,600 | 260 | 83.7 | 518 | 150 | 71.0 | 5 | <5 | |
| 31 | 2.6 | 4.3 | 11.0 | 2.56 | 20 | 26 | 14.1 | 1,600 | 310 | 80.7 | 518 | 200 | 61.5 | 5 | <5 | |

Alcohols, other than cyclohexanol, which contain from 5 to 12 carbon atoms and which are particularly suitable for use under the conditions and in the apparatus described in the foregoing examples include primary and secondary amyl alcohols, iso-amyl alcohol, primary and secondary hexyl alcohols, primary and secondary octyl alcohols, primary and secondary decyl alcohols, lauryl alcohol, furfuryl alcohol, and benzyl alcohol. The only limitations on the alcohol which may be used to form the hemiformal employed in the novel process of this invention are that it be sufficiently reactive to form a hemiformal with formaldehyde at a rate faster than the rate of diffusion of the formaldehyde through the liquid, as already described hereinabove, that its vapor pressure be sufficiently low so as not to contaminate the formaldehyde gas at the operating temperature, and that the viscosity of the hemiformal solution be less than 200 centipoises in the operating temperature rang of —15° to +20° C. Primary and secondary alcohols containing 5 to 12 carbon atoms possess these properties, but tertiary alcohols are deficient in these properties.

steels, and aluminum are unsuitable, particularly at elevated temperatures.

The above examples describe preferred means for carrying out this invention. These means are the use of vertical tubes with smooth bores, continuously and completely wet on the inside by a flowing stream of a liquid hemiformal solution and cooled externally. Tubes of this description are preferred because they are most readily kept completely wet with the flowing hemiformal solution. Unwet or stagnant areas are undesirable because they may serve as sites for the initiation of the polymerization of formaldehyde; once polymerization starts, the tube may rapidly become blocked and require shutting down and cleaning out. For this reason, while baffled, rippled, packed, bulb- or spiral-shaped tubes have the advantage that they will increase the turbulence of the gas stream and hence increase the rate of purification by reducing the dependence of this rate of purification on the diffusion rate of impurities through the gas to the surface of the hemiformal solution, they are generally less satisfactory for continuous operation because of the difficulty of preventing polymerization in such tubes.

This invention can readily be applied to a continuous operation by recirculation of the hemiformal solution with appropriate bleed recovery of absorbed formaldehyde, and purification of a portion of the hemiformal to maintain a constant composition, as would be obvious to anyone skilled in the methods and principles of chemical engineering. Since it is preferable to employ relatively small diameter tubes to obtain effective diffusion of the impurities to the walls, high throughput rates can be obtained by the use of a large number of such tubes in parallel as long as adequate provision is allowed for circulation of coolant between the tubes. For such large-scale operation, the tubes may be constructed of moderately resistant materials such as No. 304 stainless steel; generally the preferred dimensions of such tubes are from 6 mm. to 8 mm. inside diameter, and from 4 to 10 feet in length. The number of tubes employed will depend upon the rate of formaldehyde throughput desired. While any number of such tubes may be grouped together in bundles, it has been found that it is most convenient to construct them in groups of from 1000 to 3000 tubes.

Other types of construction, such as batteries of parallel hollow plates or of hollow, concentric tubes with provision for internal cooling of the plates or concentric tubes, may be employed to support flowing films of hemiformal solutions. Generally, it is preferable to arrange such parallel plates or concentric tubes so that the spaces between them through which the formaldehyde gas flows are from 4 mm. to 30 mm. wide. Larger spacing would require excessively long plates or concentric tubes to provide sufficient time for diffusion of the normally liquid impurities from the gas to the liquid.

Analyses of the results of many experiments indicate that, for any particular tube design, the purity of the exit vapors correlates with the temperature of the exit vapors; the lower the temperature, the purer the formaldehyde obtained. Normally liquid impurities other than water, methanol, and formic acid are removed by the use of this invention. Such impurities may include methyl formate, cyclohexanol, and other alcohols, esters, and acids, as well as aldehydes and ketones, depending on the source of the impure formaldehyde. About the same percentages of such impurities are removed as described for water in the examples cited above; generally, the higher-boiling impurities are removed somewhat more efficiently than low-boiling impurities such as methyl formate.

From consideration of data obtained during purification of formaldehyde as described in the examples, it appears that the recovery of formaldehyde is roughly proportional to the gas rate and to the formaldehyde content of the hemiformal solution, while it is inversely proportional to the liquid feed rate and to the water content of hemiformal solution. The recovery is substantially independent of whether the co-current or the counter-current method of operation is employed. While the recovery of formaldehyde is not sensitive to the amount of water removed from the gas, it appears that at least one mole of formaldehyde is absorbed in the hemiformal solution per mole of water removed from the gas. Therefore, it is possible to obtain higher recoveries of purified formaldehyde when the water content of the impure formaldehyde is quite low, initially, than when the formaldehyde contains 3%–4% water. Other factors which affect formaldehyde recovery are the ratio of hemiformal solution to gaseous formaldehyde, which should be low for high recovery, the rate of flow of the gaseous formaldehyde, which should be high for high recovery, and the formaldehyde content of the hemiformal solution, which should be higher than 50 mole percent, the theoretical value for pure hemiformal, if higher formaldehyde recovery is desired.

Where desired, this invention may be employed in a two-stage process whereby formaldehyde gas of 95%–98% purity is purified to about 99.6% purity by passage over flowing films of hemiformal solution, as hereinabove described, and then further purified to better than 99.99% purity by passage over a second set of flowing films. It should be obvious from the data that a greater percentage of the normally liquid impurities originally present in the impure formaldehyde are removed when 1% to 5% impurities are present originally than when the process of this invention is employed to further purify formaldehyde gas containing less than 1% of such impurities.

While the examples have illustrated the use of flowing, tubular films of hemiformal solution flowing in laminar flow down cold, smooth-bore, vertical tubes, it should be evident that many other constructions may be employed by those skilled in the art without in any way departing from the scope of this invention which comprises a process for the purification of gaseous formaldehyde, containing originally from 0.04% to 5% by weight of normally liquid impurities, by contacting flowing streams of the impure gaseous formaldehyde with a liquid hemiformal solution, of a type defined hereinabove, flowing as continuous films downward over smooth, inert, solid surfaces maintained at −15° to +20° C. and maintaining this contact of flowing gas with flowing liquid film until from 60% to 98% of the normally liquid impurities originally present in the impure formaldehyde have been removed by diffusion to, and solution in, the flowing hemiformal solution.

I claim:

1. A process for the purification of gaseous formaldehyde, containing from 0.04% to 5% by weight of normally liquid impurities, which comprises forming a flowing liquid-gas interface by passing a stream of said impure gaseous formaldehyde into contact with a flowing surface of a liquid hemiformal solution containing initially from 8 to 73 mole percent of combined plus dissolved formaldehyde and from 92 to 27 mole percent of an alcohol chosen from the group consisting of primary and secondary alcohols containing 5 to 12 carbon atoms per molecule, said liquid hemiformal solution being in the form of a continuous film flowing over an inert continuous, smooth solid surface maintained at −15° to +20° C. and maintaining said flowing liquid-gas interface for a time sufficient to allow 60% to 98% of the normally liquid impurities originally in the formaldehyde gas to diffuse to the liquid-gas interface and to dissolve in the liquid hemiformal solution.

2. A process for the purification of gaseous formaldehyde, containing originally from 0.04% to 5% by weight of normally liquid impurities which comprises contacting flowing streams of said impure gaseous formaldehyde with a liquid hemiformal solution flowing as continuous films downward over inert continuous, smooth, solid surfaces maintained at −15° to +20° C., said liquid hemiformal solution being formed from the reaction of from 8 to 73 mole percent of formaldehyde with from 92 to 27 mole percent of an alcohol chosen from the group consisting of primary and secondary alcohols containing from 5 to 12 carbon atoms per molecule, and maintaining contact of said flowing gas with said flowing liquid film until 60% to 98% of the normally liquid impurities originally present in said impure formaldehyde have diffused to the flowing liquid surface and dissolved in said liquid hemiformal solution.

3. A process for the purification of gaseous formaldehyde containing originally from 0.04% to 5% by weight of normally liquid impurities which comprises contacting flowing streams of said impure gaseous formaldehyde with liquid hemiformal solution flowing in laminar flow as a multiplicity of continuous films downward over continuous smooth, inert, solid surfaces maintained at −15° to +20° C., said inert solid surfaces being separated from each other by spaces from 4 mm. to 30 mm. wide filled with the aforesaid flowing streams of impure gaseous formaldehyde, said liquid hemiformal solution being formed from the reaction of from 8 to 73 mole percent of formaldehyde with from 92 to 27 mole percent of an alcohol chosen from the group consisting of primary and secondary alcohols containing from 5 to 12 carbon atoms per molecule, and maintaining contact of said flowing gas with said laminarly flowing liquid films until from 60% to 98% of the normally liquid impurities originally present in said impure formaldehyde have diffused to the flowing liquid surface and dissolved in said liquid hemiformal solution.

4. A process for the purification of gaseous formaldehyde containing from 0.04% to 5% by weight of normally liquid impurities which comprises forming flowing tubular liquid-gas interfaces inside smooth-bore, vertical tubes by passing a stream of said impure gaseous formaldehyde through the tubes in contact with a continuous surface of a liquid hemiformal solution flowing down the walls of said tubes, said hemiformal solution containing initially from 8 to 73 mole percent of combined plus dissolved formaldehyde and from 92 to 27 mole percent of an alcohol chosen from the group consisting of primary and secondary alcohols containing from 5 to 12 carbon atoms per molecule, said tubes having a length-to-internal diameter ratio of from 60 to 1525, and an internal diameter of from 4 mm. to 20 mm., and a length of from 2 to 25 feet, the walls of said tubes being cooled externally by circulation of a fluid coolant at from $-15°$ to $+20°$ C., and removing formaldehyde, purified of from 60% to 98% of the normally liquid impurities originally present, from the tube exit.

5. A process for the purification of gaseous formaldehyde, containing from 0.04% to 5% by weight of normally liquid impurities, which comprises forming a flowing liquid-gas interface by passing a stream of said impure gaseous formaldehyde into contact with a flowing surface of a cyclohexyl hemiformal solution containing initially from 2.6% to 45% by weight of combined plus dissolved formaldehyde and from 97.4% to 55% by weight of cyclohexanol, said liquid cyclohexyl hemiformal solution being in the form of a continuous film flowing over an inert continuous, smooth solid surface maintained at $-15°$ to $+20°$ C. and maintaining said flowing liquid-gas interface for a time sufficient to allow 60% to 98% of the normally liquid impurities originally in the formaldehyde gas to diffuse to the liquid-gas interface and to dissolve in the cyclohexyl hemiformal solution.

6. A process according to claim 4 wherein the liquid hemiformal solution is a cyclohexyl hemiformal solution.

7. A process according to claim 6 wherein the cyclohexyl hemiformal solution contains from 21% to 23% by weight of formaldehyde.

8. A process according to claim 7 wherein the ratio, by weight, of the rate of flow of the cyclohexyl hemiformal solution to the rate of flow of the gaseous formaldehyde is between 0.2 and 4.0 and the rate of flow of gaseous formaldehyde is from 0.5 gram per minute to 25 grams per minute per tube.

9. A process according to claim 7 wherein the inlet coolant temperature is from $+1°$ to $+5°$ C. and wherein the impure formaldehyde gas supplied to the tubes contains from 0.4% to 3% of normally liquid impurities.

10. A process for the purification of gaseous formaldehyde containing from 0.04% to 4% by weight of normally liquid impurities which comprises forming a flowing liquid-gas interface inside a smooth bore, vertical tube by passing a stream of said impure formaldehyde at from 0.5 grams to 25 grams per minute through said tube while allowing liquid cyclohexyl hemiformal solution containing from 2.6% to 45% by weight of combined plus dissolved formaldehyde in cyclohexanol, to flow down the walls of said tube as a continuous, tubular film, the ratio, by weight, of the rate of flow of the liquid cyclohexyl hemiformal solution to the rate of flow of the gaseous formaldehyde being maintained between 0.2 and 4.0, and the aforesaid tube having an internal diameter of from 4 mm. to 13 mm. and a length of from 2 feet to 10 feet and being cooled externally by circulation of a coolant at from $-15°$ C. to $+20°$ C.

11. A process according to claim 10 wherein the impure gaseous formaldehyde contains from 0.04% to 1% by weight of normally liquid impurities and the cyclohexyl hemiformal solution contains from 25% to 45% by weight of combined plus dissolved formaldehyde.

12. A process according to claim 10 wherein the coolant temperature is from $+1°$ to $+5°$ C.

13. A process according to claim 10 in which the normally liquid impurities consist principally of water, methanol, formic acid, methyl formate, and cyclohexanol.

14. A process for the purification of gaseous formaldehyde containing from 0.4% to 3% by weight of normally liquid impurities which comprises forming a multiplicity of flowing, tubular liquid-gas interfaces inside a multiplicity of smooth-bore, vertical tubes, said tubes being from 6 mm. to 10 mm. in internal diameter and from 4 feet to 10 feet in length and cooled externally by circulation of a coolant at from $-15°$ to $+10°$ C., by passing said impure gaseous formaldehyde at from 2 to 10 grams per minute per tube through said tubes while allowing liquid cyclohexyl hemiformal solution containing from 21% to 23% by weight of formaldehyde in cyclohexanol to flow down the walls of said tubes as continuous, tubular films at from 3 to 12 grams per minute per tube, drawing off purified formaldehyde from an exit reservoir, collecting said cyclohexyl hemiformal solution in a reservoir below the tubes and recirculating said cyclohexyl hemiformal solution while maintaining its composition constant by separating a portion of it, treating said separated portion of cyclohexyl hemiformal solution to remove absorbed impurities and excess formaldehyde, and returning the purified solution to the aforesaid recycled cyclohexyl hemiformal solution.

15. A process according to claim 14 in which the normally liquid impurities consist principally of water, methanol, formic acid, methyl formate, and cyclohexanol.

16. A process for the purification of gaseous formaldehyde containing from 0.4% to 5% by weight of normally liquid impurities which comprises forming a multiplicity of flowing, tubular liquid-gas interfaces inside a multiplicity of smooth-bore, vertical tubes, said tubes being cooled externally by circulation of coolant at from $-15°$ to $+20°$ C., by passing into said tubes impure formaldehyde gas in admixture with a proportion of the vapors of an alcohol, chosen from the group consisting of primary and secondary alcohols containing 5 to 12 carbon atoms, such that there is condensed onto the cold inside walls of the aforesaid vertical tubes a flowing film of liquid hemiformal solution containing initially from 8 to 73 mole percent of combined plus dissolved formaldehyde and from 92 to 27 mole percent of the aforesaid alcohol while the gaseous formaldehyde is passed along through the tubes in a gaseous state, maintaining the aforesaid flowing liquid-gas interface down the length of said tubes, and removing from the tube exit gaseous formaldehyde, purified of from 60% to 98% of the normally liquid impurities originally present in the aforesaid impure formaldehyde.

17. A process according to claim 16 wherein the alcohol employed is cyclohexanol and wherein the tubes have a length-to-internal diameter ratio of from 60 to 1525, an internal diameter of from 4 mm. to 20 mm. and a length of from 2 to 25 feet.

References Cited in the file of this patent
UNITED STATES PATENTS 1,426,449    Backhaus et al.    Aug. 22, 1922